US012670533B2

(12) United States Patent
Yuan et al.

(10) Patent No.: US 12,670,533 B2
(45) Date of Patent: Jun. 30, 2026

(54) MESSAGING BASED ON AGRICULTURAL KNOWLEDGE GRAPH

(71) Applicant: Deere & Company, Moline, IL (US)

(72) Inventors: Zhiqiang Yuan, San Jose, CA (US);
Hong Wu, Los Altos, CA (US); Yujing Qian, Mountain View, CA (US);
Francis Ebong, San Francisco, CA
(US); Elliott Grant, Woodside, CA
(US); Ngozi Kanu, Pleasanton, CA
(US); Bodi Yuan, Sunnyvale, CA (US);
Chunfeng Wen, Santa Clara, CA (US);
Chen Cao, San Jose, CA (US); Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 709 days.

(21) Appl. No.: 17/958,818

(22) Filed: Oct. 3, 2022

(65) Prior Publication Data

US 2024/0112282 A1 Apr. 4, 2024

(51) Int. Cl.
*G06Q 50/02* (2024.01)
*G06N 5/02* (2023.01)
(52) U.S. Cl.
CPC .............. *G06Q 50/02* (2013.01); *G06N 5/02* (2013.01)
(58) Field of Classification Search
None
See application file for complete search history.

(56) References Cited

U.S. PATENT DOCUMENTS

| | | | | |
|---|---|---|---|---|
| 9,792,557 B2 * | 10/2017 | Mathur | .................... | G06N 7/01 |
| 2017/0139380 A1 * | 5/2017 | England | .................... | A01G 9/28 |
| 2020/0273172 A1 * | 8/2020 | Weldemariam | ...... | G06N 3/0895 |
| 2021/0068334 A1 * | 3/2021 | Mutahi | .................. | G06N 20/00 |
| 2022/0155298 A1 * | 5/2022 | Heilmann | .............. | G16B 50/10 |
| 2022/0156603 A1 * | 5/2022 | Marvaniya | ............. | G06V 20/13 |

(Continued)

OTHER PUBLICATIONS

Ngo et al., "OAK: Ontology-based Knowledge Map Model for Digital Agriculture" arXiv:2011.11442v1 [cs.DB], 15 pages, dated Nov. 20, 2020.

(Continued)

*Primary Examiner* — Mi'Schita' Henson
(74) *Attorney, Agent, or Firm* — Hanley, Flight & Zimmerman, LLC

(57) ABSTRACT

Implementations are described herein for leveraging an agricultural knowledge graph to generate messages automatically. In various implementations, an agricultural event may trigger proactive performance of one or more of the following operations. Nodes of the agricultural knowledge graph may be identified as related to the agricultural event, including field node(s) representing subject agricultural field (s) to which the agricultural event is relevant and other node(s) connected to one or more of the field nodes by edge(s). Machine learning model(s) may be accessed based on the identified nodes and/or the edges that connect the identified nodes. Data relevant to the subject agricultural field(s) may be retrieved from data source(s) controlled by an agricultural entity and processed based on the machine learning model(s) to generate inference(s) about the subject agricultural field(s). Agricultural message(s) based on the inference(s) may be pushed to client computing device(s) controlled by the agricultural entity.

20 Claims, 6 Drawing Sheets

(56) References Cited

U.S. PATENT DOCUMENTS

| 2023/0325707 | A1* | 10/2023 | Yuan | G06N 5/025 |
| 2024/0070527 | A1* | 2/2024 | Mukherjee | G06N 20/00 |
| 2024/0112282 | A1* | 4/2024 | Yuan | G06N 5/022 |
| 2024/0373826 | A1* | 11/2024 | Wildisen | H04Q 9/00 |

OTHER PUBLICATIONS

Guan et al., "Diagnosis of Fruit Tree Diseases and Pests Based on Agricultural Knowledge Graph" 2021 International Conference on Advances in Optics and Computational Sciences, Journal of Physics: Conference Series, 1865 (2021) 042052, doi: 10.1088/1742-6596/1865/4/042052, 9 pages.

Qin et al., "Agriculture Knowledge Graph Construction and Application" BDAI 2020, Journal of Physics: Conference Series, 1756(2021) 012010, doi:10.1088/1742-6596/1756/1//012010, 9 pages.

Xie et al., "Recommendation algorithm for agricultural products based on attention factor decomposer and knowledge graph" 2022 Asia Conference on Algorithms, Computing and Machine Learning (CACML). DOI 10.1109/CACML55074.2022.00100, 6 pages.

Zhang et al., "Research and Application of Agriculture Knowledge Graph" 2021 Association for Computing Machinery. 9 pages.

Chen et al., "AgriKG: An Agricultural Knowledge Graph and Its Applications" DASFAA 2019, LNCS 11448, pp. 533-537.

\* cited by examiner

500

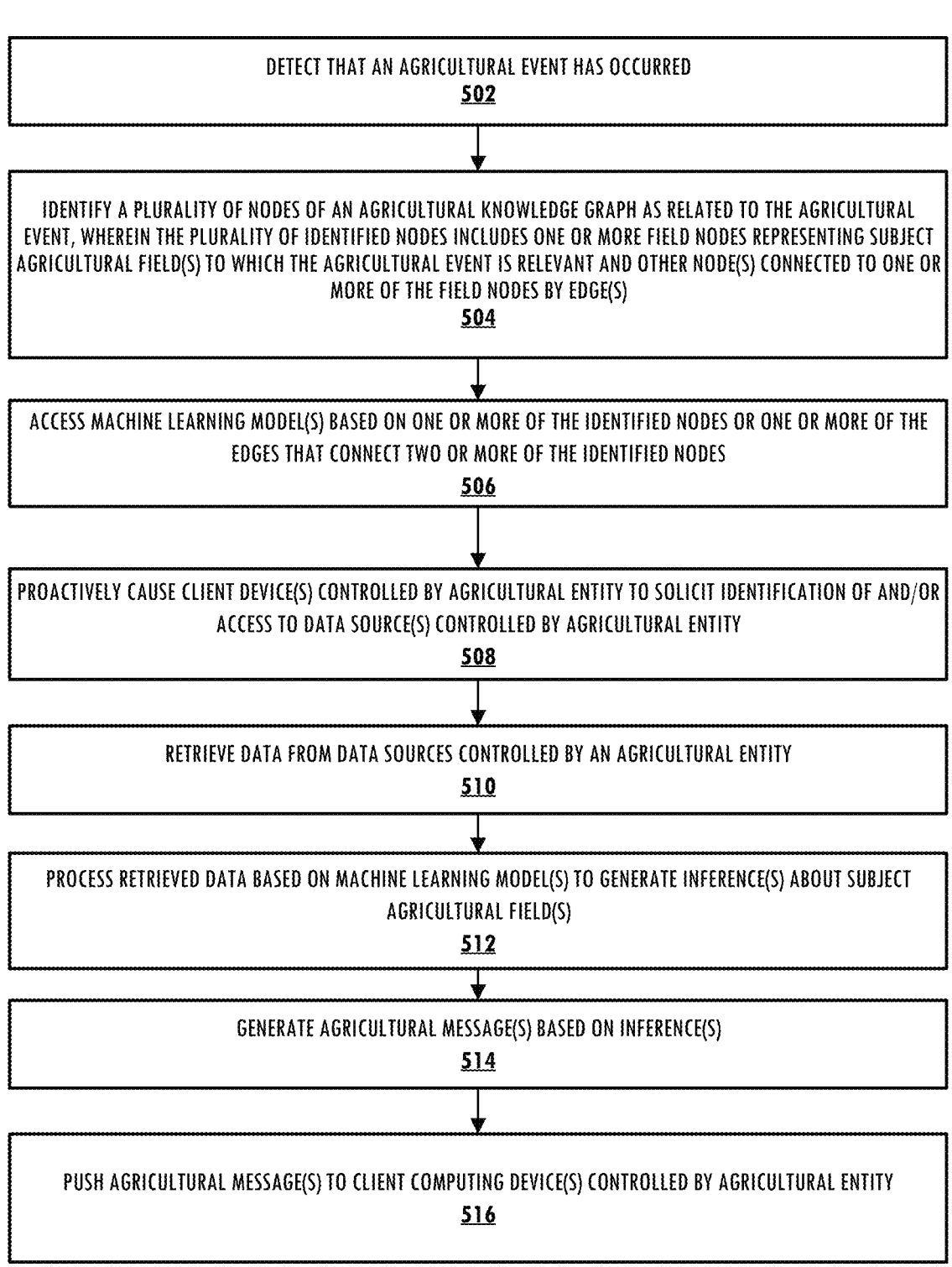

DETECT THAT AN AGRICULTURAL EVENT HAS OCCURRED
502

IDENTIFY A PLURALITY OF NODES OF AN AGRICULTURAL KNOWLEDGE GRAPH AS RELATED TO THE AGRICULTURAL EVENT, WHEREIN THE PLURALITY OF IDENTIFIED NODES INCLUDES ONE OR MORE FIELD NODES REPRESENTING SUBJECT AGRICULTURAL FIELD(S) TO WHICH THE AGRICULTURAL EVENT IS RELEVANT AND OTHER NODE(S) CONNECTED TO ONE OR MORE OF THE FIELD NODES BY EDGE(S)
504

ACCESS MACHINE LEARNING MODEL(S) BASED ON ONE OR MORE OF THE IDENTIFIED NODES OR ONE OR MORE OF THE EDGES THAT CONNECT TWO OR MORE OF THE IDENTIFIED NODES
506

PROACTIVELY CAUSE CLIENT DEVICE(S) CONTROLLED BY AGRICULTURAL ENTITY TO SOLICIT IDENTIFICATION OF AND/OR ACCESS TO DATA SOURCE(S) CONTROLLED BY AGRICULTURAL ENTITY
508

RETRIEVE DATA FROM DATA SOURCES CONTROLLED BY AN AGRICULTURAL ENTITY
510

PROCESS RETRIEVED DATA BASED ON MACHINE LEARNING MODEL(S) TO GENERATE INFERENCE(S) ABOUT SUBJECT AGRICULTURAL FIELD(S)
512

GENERATE AGRICULTURAL MESSAGE(S) BASED ON INFERENCE(S)
514

PUSH AGRICULTURAL MESSAGE(S) TO CLIENT COMPUTING DEVICE(S) CONTROLLED BY AGRICULTURAL ENTITY
516

Fig. 5

MESSAGING BASED ON AGRICULTURAL KNOWLEDGE GRAPH

BACKGROUND

The rise of precision agriculture has enabled growers to manage their crops more efficiently, which increases crop yields and reduces waste, among other things. Autonomous vehicles such as sensor-equipped robots, as well as sensor packages mounted on conventional agricultural vehicles such as tractors, booms, etc., enable growers to gather ever-more-massive sensor data about crops than is practical with human-based sampling. Machine learning (ML) has enabled the growers to extract value from the gathered sensor data. However, while most growers have significant expertise in agriculture, they may lack expertise in data science. Consequently, growers tend to work with data scientists to implement ML pipelines tailored to the growers' individual needs. However, this paradigm does not scale well to the ever-changing needs of a typical grower.

SUMMARY

Implementations are described herein for leveraging an agricultural knowledge graph to generate messages (e.g., recommendations, warnings) for growers automatically based on agricultural events. More particularly, but not exclusively, techniques are described herein for using the agricultural knowledge graph to relate various dynamics to individual agricultural fields in order to generate relevant information for growers. The agricultural knowledge graph is adaptable to process inputs in various intuitive, unstructured, and/or varying forms, such as images of crops, natural language, other sensor data, etc., without requiring repeated ML model updates or replacements. As a consequence, information may be flexibly and proactively provided to the growers and/or provided upon request.

In various implementations, a method may be implemented using one or more processors and may include: detecting that an agricultural event has occurred, and in response to detecting the agricultural event, proactively performing one or more of the following operations: identifying a plurality of nodes of an agricultural knowledge graph as related to the agricultural event, wherein the agricultural knowledge graph includes nodes connected by edges that represent semantic relationships between the nodes, and wherein the plurality of identified nodes includes one or more field nodes representing one or more subject agricultural fields to which the agricultural event is relevant and one or more other nodes connected to one or more of the field nodes by one or more edges; accessing one or more machine learning models based on one or more of the identified nodes or one or more of the edges that connect two or more of the identified nodes; retrieving data from one or more data sources controlled by an agricultural entity, wherein the one or more data sources contain data that is relevant to the one or more subject agricultural fields; processing the retrieved data based on the one or more machine learning models to generate one or more inferences about one or more of the subject agricultural fields; generating one or more agricultural messages based on the one or more inferences; and pushing the one or more agricultural messages to one or more client computing devices controlled by the agricultural entity.

In various implementations, the one or more proactively performed operations may include proactively causing one or more of the client devices controlled by the agricultural entity to solicit identification of and/or access to one or more of the data sources controlled by the agricultural entity.

In various implementations, detecting the agricultural event may include detecting the agricultural event based on one or more changes to the agricultural knowledge graph. In various implementations, the agricultural event may be a weather event, and the one or more changes to the agricultural knowledge graph include onboarding of new weather data describing the weather event. In various implementations, the agricultural event may be a valuation of a type of crop grown in one or more of the subject agricultural fields, and the one or more changes to the agricultural knowledge graph include onboarding, to the agricultural knowledge graph, of new data describing the crop valuation. In various implementations, the agricultural event may include detected presence of a computing device carried by an agricultural worker being detected in one or more of the subject agricultural fields.

In various implementations, the agricultural event may be an event that occurs in a nearby agricultural field that is adjacent to, or within a predetermined distance of, one or more of the subject agricultural fields. In various implementations, identifying the plurality of nodes may include traversing the agricultural knowledge graph from one or more of the field nodes representing the subject agricultural fields to another field node representing the nearby agricultural field. In various implementations, the agricultural event may include one or more of application of an herbicide or application of a pesticide. In various implementations, the agricultural event may include one or more of detection of a plant disease or pest infestation. In various implementations, the agricultural event may include detection of one or more types of weeds.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in transitory and/or non-transitory computer-readable memory, and where the instructions are configured to enable performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart of an example method in accordance with various implementations described herein.

DETAILED DESCRIPTION

Figure 1:
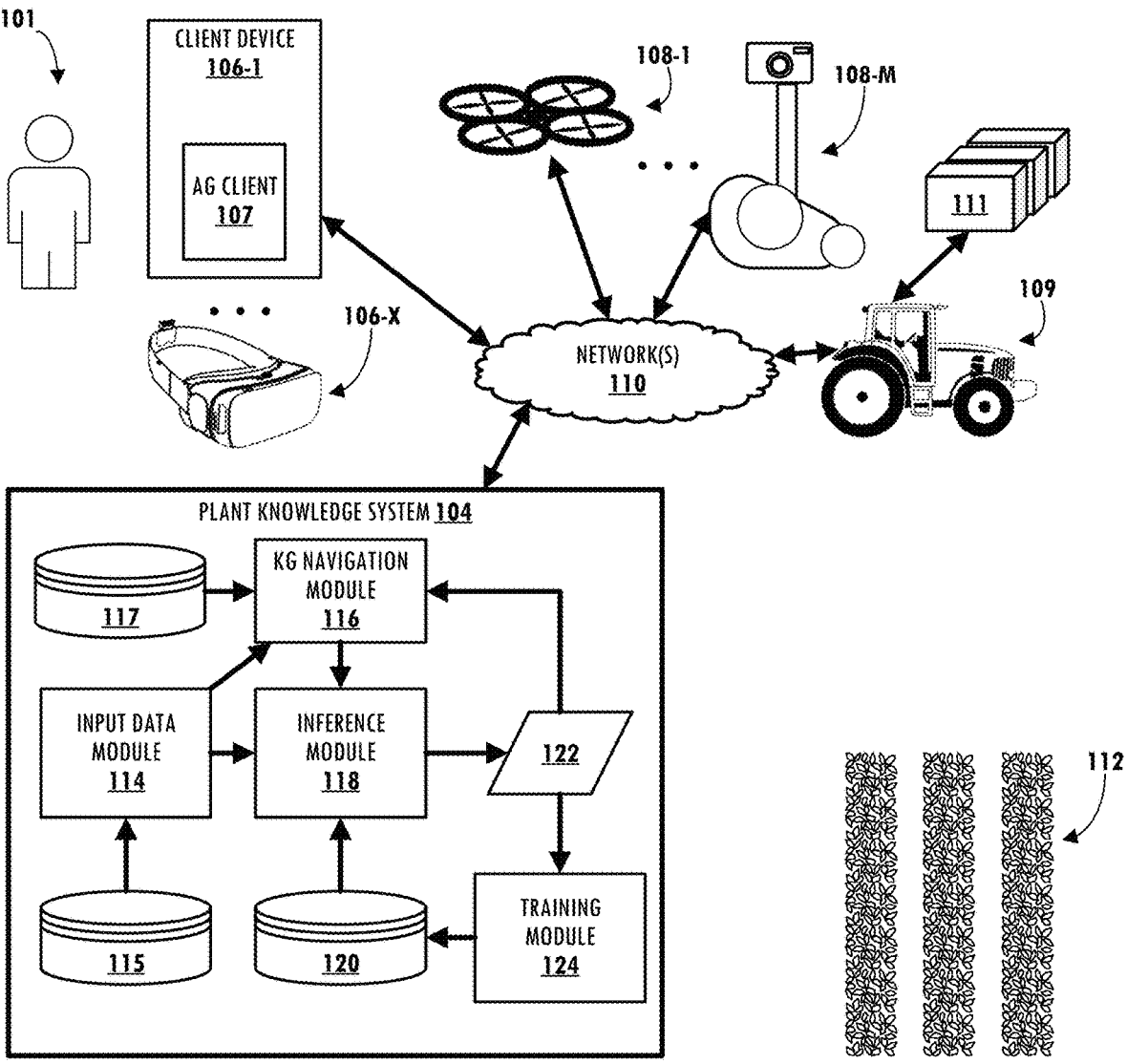
FIG. 1 schematically depicts an example environment in which selected aspects of the present disclosure may be employed in accordance with various implementations.

Implementations are described herein for leveraging an agricultural knowledge graph (KG) to generate messages (e.g., recommendations, warnings) for growers automatically based on agricultural events. More particularly, but not exclusively, techniques are described herein for using the agricultural KG to relate various dynamics to individual agricultural fields in order to generate relevant information for growers. The agricultural KG is adaptable to process inputs in various intuitive, unstructured, and/or varying forms, such as images of crops, natural language, other sensor data, etc., without requiring repeated ML model updates or replacements. As a consequence, information may be flexibly and proactively provided to the growers and/or provided upon request.

In various implementations, the agricultural KG may be used to push useful information to grower(s) in response to various agricultural events. Some agricultural events may impact or influence individual agricultural fields directly. For example, weather events such as rainfall, hurricane, frost, drought, extreme heat, flooding (natural or caused by man), etc., may impact the growth or health of crops directly. Pest or weed infestation likewise may impact crops in fields in which those pests or weeds are detected. Crop management events such as chemical application, irrigation, tillage, etc. may also directly impact crops in those fields being managed.

Additionally, agricultural events occurring in one field may predict agricultural event(s) other field(s). For example, detection of pests or weeds in one field may predict a likely future infestation of the same type of pests or weeds in nearby field(s), assuming no action is taken and/or crops grown in the nearby field(s) are vulnerable to those pests or weeds. Similarly, application of a particular pesticide or herbicide to one field may predict potential future infestation of nearby field(s) by the pest or weed targeted by that pesticide or herbicide, again assuming no action is taken.

Agricultural events are not limited to those set forth above. For example, in addition to conclusions (e.g., pest infestation, weed detection) drawn from observations, agricultural events can include facts or observations that, standing alone, are weak indicators of other agricultural events, or that are predictive of multiple different candidate agricultural events. For example, suppose brown spotting is observed on leaves in a field. This crop condition may be equally predictive of pest infestation, over-watering, poor soil composition, etc. In various implementations, the agricultural KG may be leveraged to determine other agricultural events that are relevant to the same crop field. These other agricultural events may then be used to narrow down the cause of the brown spotting. For example, a node representing a flooding event may be connected by one or more edges of the knowledge graph to a node representing the field, e.g., by virtue of the flooding event occurring near the field. This relationship represented in the agricultural KG may be used to determine that over-watering, rather than other candidate causes, is likely causing the leaf spotting.

Agricultural events can take other forms as well. For example, an individual carrying a computing device such as a mobile phone equipped with a position coordinate sensor into a particular field may qualify as an agricultural event.

As another example, when a user operates a graphical user interface (GUI) to browse agricultural fields, the user clicking on a particular field may qualify as an agricultural event. In either case, the agricultural KG may be used to push data to that individual that is relevant to that field. Other agricultural events that may be detected as changes to the agricultural KG may include, for instance, crop valuations that indicate supply of and/or demand for crops. For example, a crop valuation that indicates a particular crop will obtain a high price in the market may cause growers who are growing that crop and are near the point of harvest to receive notifications, e.g., so that they can harvest sooner than they might have otherwise.

For example, upon detecting the individual in the field, the agricultural KG may be consulted to determine which crops have been crop in the field over the last x crop cycles (e.g., crop rotation), which tillage practices have been implemented in the field, past soil compositions, past chemical (e.g., fertilizer) applications, etc. For example, the node representing the field may be connected to other nodes representing these other data.

Additionally, the agricultural KG may be consulted to determine historical and/or typical agricultural practices of the individual, or the agricultural entity they represent (e.g., are employed by). For example, a node representing the agricultural entity may be connected to other nodes representing other fields the agricultural entity has managed or is currently managing, agricultural management practices implemented in those fields, crops grown in those fields, etc. These data may be compiled, encoded (e.g., into feature vectors or embeddings), and/or otherwise preprocessed to determine whether the current field is suitable for management by the agricultural entity. For instance, various data from these sources may be encoded and processed using one or more crop yield prediction ML models to predict a crop yield the agricultural entity is likely to achieve, assuming they grow the same crops and/or implement the same management practices as they have in the past.

The agricultural KG may provide access to various ML models that can be applied to various data to generate various inferences. Some nodes may represent and/or provide access to one or more ML models. Additionally or alternatively, some edges may provide access to or represent ML models. The inferences that can be generated using these ML models may include, for instance, crop yield estimates or predictions, weed classifications, pest identifications, soil composition predictions, plant health summaries, fruit counts, etc. The data to which these ML models can be applied may also vary widely, and may include imagery captured by various ground-based and/or airborne vehicles (e.g., robots, UAVs, rovers, satellites, tractors, etc.), numeric data, natural language (e.g., grower remarks, contractual language, invoices), etc.

In various implementations, nodes of the agricultural KG—particularly nodes that provide access to ML models—may be connected to other nodes in various ways over time, such that the agricultural KG "learns" which underlying entities are related to each other or tend to be related to each other by users. For example, suppose multiple growers in a particular geographic area (e.g., in a particular valley) onboard imagery to the knowledge graph at a similar frequency, and that those growers then request access to (or application of) strawberry count estimate ML model(s) to that imagery data. The agricultural KG may "learn" that growers in or near the particular geographic area tend to grow strawberries, and that they tend to want estimated strawberry counts. Consequently, when a future grower in the geographic area onboards imagery data to the agricultural KG, especially at a similar frequency as the growers in the past, the agricultural KG may proactively apply the strawberry count estimate ML model(s) to that new imagery data. Assuming strawberries are detected in the new imagery data, a message may be pushed to the new grower indicating a strawberry count estimate.

Implementations described herein give rise to various technical advantages. Enabling users to generate phenotypic inferences using structured and/or unstructured input without being constrained to existing frameworks frees the users from having to design and/or redesign (or have someone else design or redesign) a machine learning processing pipeline for each crop, crop cycle, field, etc. Users are freed from having to select, or even have knowledge of, which machine learning models are to be applied under any given scenario. Instead, the agricultural KG itself may develop over time to learn which ML models should be applied to which data under which circumstances. And although users may request recommendations or other information that is retrieved using techniques described herein, it is also possible to push relevant agricultural information, such as diagnoses, recommendations, etc., to users proactively, in response to agricultural events such as weather events, crop management events, crop disease or pest diagnoses, or even in response to agricultural workers physically entering a particular field or selecting the field using a field browser GUI.

FIG. 1 schematically illustrates an environment in which one or more selected aspects of the present disclosure may be implemented, in accordance with various implementations. The example environment includes one or more agricultural plots 112 and various sensors that may be deployed at or near those areas, as well as other components that may be implemented elsewhere, in order to practice selected aspects of the present disclosure. Agricultural plots (s) 112 may be used to grow various types of crops that may produce plant parts of economic and/or nutritional interest. Agricultural plots(s) 112 may have various shapes and/or sizes. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

An individual (which in the current context may also be referred to as a "user" or "grower") may operate one or more client devices 106-1 to 106-X to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") 106-X that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems. For example, plant knowledge system 104 may be implemented remotely from farms, e.g., by server(s) forming what is often referred to as the "cloud." Alternatively, plant knowledge system 104 may be implemented wholly or in part on "edge" computing device(s) that are near the "edge," e.g., local to the farms themselves, such as client devices 106-1 to 106-X or other computing devices/sensor packages described below.

Each client device 106 may operate a variety of different applications that may be used to perform various agricultural tasks, such as viewing and/or applying phenotypic inferences for various purposes, such as crop yield prediction, disease detection, pest detection, control of autonomous agricultural vehicles (e.g., robots), and so forth. For example, a first client device 106-1 operates agricultural ("AG") client 107 (e.g., which may be standalone or part of another application, such as part of a web browser). Another client device 106-X may take the form of an HMD that is configured to render 2D and/or 3D data to a wearer as part of a VR immersive computing experience. For example, the wearer of client device 106-X may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, one or more robots 108-1 to 108-M and/or other agricultural vehicles 109 may be deployed and/or operated to perform various agricultural tasks. These tasks may include, for instance, harvesting, irrigating, fertilizing, chemical application, trimming, pruning, sucker/bud removal, etc. An individual robot 108-1 to 108-M may take various forms, such as an unmanned aerial vehicle 108-1, a robot (not depicted) that is propelled along a wire, track, rail or other similar component that passes over and/or between crops, a wheeled robot 108-M, a rover that straddles a row of plants (e.g., so that the plant pass underneath the rover), or any other form of robot capable of being propelled or propelling itself past crops of interest.

In some implementations, different robots may have different roles, e.g., depending on their capabilities. For example, in some implementations, one or more of robots 108-1 to 108-M may be designed to capture and/or analyze various types of sensor data (e.g., vision, temperature, moisture, in situ soil sensor data). Others may be designed to extract samples of soil and/or plant matter, e.g., for ex situ analysis at a remote laboratory (also referred to as "grab" sampling). Yet others may be designed to manipulate plants or perform physical agricultural tasks. And some robots may do all three. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, soil sensors, etc. This sensor data may be organized as structured agricultural data, e.g., in database(s) in accordance with known/consistent schemas, in spreadsheets, in organized textual files (e.g., comma-delimited, tab-delimited), etc.

In addition to or instead of robots, in some implementations, agricultural vehicles 109 such as the tractor depicted in FIG. 1, center pivots, boom sprayers (which may be affixed to tractors or other agricultural vehicles), threshers, etc. may be leveraged to acquire various sensor data. For example, one or more modular computing devices 111 (also referred to as "sensor packages") may be mounted to agricultural vehicle 109 and may be equipped with any number of sensors, such as one or more vision sensors that capture images of crops, or other sensors such as soil sensors, moisture sensors, thermometers, etc.

In various implementations, plant knowledge system 104 may be implemented across one or more computing systems, such as the cloud mentioned previously and/or one or more edge computing devices, such as client devices 106-1 to 106-X, robots 108-1 to 108-M, modular computing device(s) 111, etc. Plant knowledge system 104 may receive sensor data generated by robots 108-1 to 108-M, modular computing devices 111, and/or agricultural personnel and process it using various techniques to perform tasks such as making phenotypic predictions 122. In various implementations, plant knowledge system 104 may include an input data module 114, an agricultural KG navigation module 116, an inference module 118, and a training module 124. In some implementations one or more of modules 114, 116, 118, and/or 124 may be omitted, combined, and/or implemented in a component that is separate from plant knowledge system 104.

Input data module 114 may be configured to obtain input from various sources, such as client device(s) 106, modular computing device(s) 111, robots 108-1 to 108-M, agricultural vehicle 109, databases of recorded agricultural data (e.g., logs), etc. As indicated by the arrows, input data module 114 may provide these input data to KG navigation module 116 and/or inference module 118. Plant knowledge system 104 may also include one or more databases. For example, plant knowledge system 104 may include, in communication with input data module 114, a database 115 for storing structured and/or unstructured agricultural data. Structured agricultural data may include any data that is collected and organized in a consistent and predictable manner. One example is sensor data collected by robots 108-1 to 108-M and/or other agricultural vehicles 109. Another example of structured agricultural data may be data that is input by agricultural personnel into spreadsheets, input forms, etc., such that the data is collected and organized, e.g., by input data module 114, in a consistent and/or predictable manner. For example, growers may maintain logs of how and/or when various management practices (e.g., irrigation, pesticide application, herbicide application, tillage) were performed. Other examples of structured agricultural data may include, for instance, satellite data, climate data from publicly available databases, and so forth.

Unstructured agricultural data may include any data that is collected from sources that are not organized in any consistent or predictable manner. These sources may include, for instance, natural language textual snippets obtained from a variety of sources. As one example, AG client 107 may provide an interface for a user 101 to record spoken utterances. These utterances may be stored as audio recordings, transcribed into text via a speech-to-text (STT) process and then stored, and/or encoded into embeddings and then stored. Other potential sources of natural language textual snippets include, but are not limited to, documents such as contracts and invoices, electronic correspondence (e.g., email, text messaging), periodicals such as newspapers (e.g., reporting floods or other weather events that can impact crops), and so forth. Documents may be obtained, e.g., by input data module 114, from sources such as a client device 106.

Plant knowledge system 104 may also include a machine learning model database 120 that includes a variety of different ML models, such as phenotyping ML models. In various implementations, each phenotyping ML model may be trained to generate one or more inferences 122 at various levels of specificity or granularity. In some implementations, a phenotypic taxonomy of ML models may be provided that is hierarchical and may or may not be governed or provided, in whole or in part, by the International Code of Zoological Nomenclature. In this specification, the term "database" and "index" will be used broadly to refer to any collection of data. The data of the database and/or the index does not need to be structured in any particular way and it can be stored on storage devices in one or more geographic locations.

A KG database 117 may store data indicative of an agricultural KG 117. In various implementations, the agricultural KG 117 may include nodes representing agricultural entities and edges that represent relationships between those agricultural entities. In the agricultural context, entities may include abstract concepts such as types of crops, types of disease or pests, types of farm equipment, and so forth. Entities may also include concrete concepts such as specific people, locations (e.g., individual fields or farms), objects, various data sources, agricultural events (including data about those events), etc. In some implementations, agricultural KG 117 may be stored in a graph database.

KG navigation module 116 may be configured with selected aspects of the present disclosure to navigate/traverse through the agricultural KG stored in agricultural KG 117 in response to a variety of different agricultural events (non-limiting examples which were described previously). KG navigation module 116 may perform this navigation to identify various data sources that are relevant to (e.g., influence, influenced by) the agricultural event. Likewise, KG navigation module 116 may identify various ML models (e.g., phenotypic, classifiers, prediction, etc.) and/or ML-based processing pipelines that can be used to process data retrieved from those data sources to generate agricultural inferences. Based on these agricultural inferences, messages may be generated and provided (e.g., pushed) to relevant stakeholders, such as growers.

During one or more training phases, training module 124 may be configured to train any of the aforementioned ML models (or portions thereof) using ground truth and/or observed phenotypic traits. For example, training module 124 may train phenotyping ML models to make phenotypic predictions. Suppose a particular agricultural plot 112 yields 1,000 units of a plant-trait-of-interest. Images of crops in that particular agricultural plot may be captured sometime in the crop cycle prior to harvest. These images may be taken from ground-based vehicles, UAVs, satellites, etc. These images may be processed using a crop yield estimation machine learning model to predict crop yield. This predicted crop yield may then be compared, e.g., by training module 124, to the ground truth crop yield to determine an error. Based on this error, training module 124 may train one or more of the machine learning models in database 120, e.g., using techniques such as back propagation and gradient descent.

In some implementations, plant knowledge system 104 may also be configured, e.g., by way of KG navigation module 116, to provide portions of agricultural KG, including phenotypic ML models, to computing devices at or nearer the edge, such as client devices 106, robot(s) 108, and/or modular computing device(s) 111. By preemptively caching portion(s) of agricultural KG 117 in this way, these edge computing devices may be able to generate phenotypic inferences 122 in situ and/or in real time (or close to real time), without needing to wait for data to be uploaded to the cloud, or for KG navigation module 116 to navigate an entire agricultural KG 117, which may be massive. This may be particularly beneficial where these inferences 122 are used to control agricultural equipment, such as robots 108.

In some implementations, the portion(s) of agricultural KG 117 that are provided to the edge may be selected based on specific needs at the edge location (e.g., a particular farm). These needs may be determined in various ways, such as via natural language input (e.g., "I'm going to grow strawberries and raspberries in my fields"), contracts to grow particular crops, receipts identifying particular chemicals that suggest the presence of particular crops or classes of crops, etc. In some implementations, crop rotations may dictate which portion(s) of agricultural KG 117 are distributed to a given farm during a given crop cycle. For example, if strawberries are being grown in a given crop cycle, portion(s) of agricultural KG 117 that are relevant to strawberries, such as potential pests, effective fertilizers, weeds known to be endemic to the area, etc., may be cached at the edge.

Figure 2:
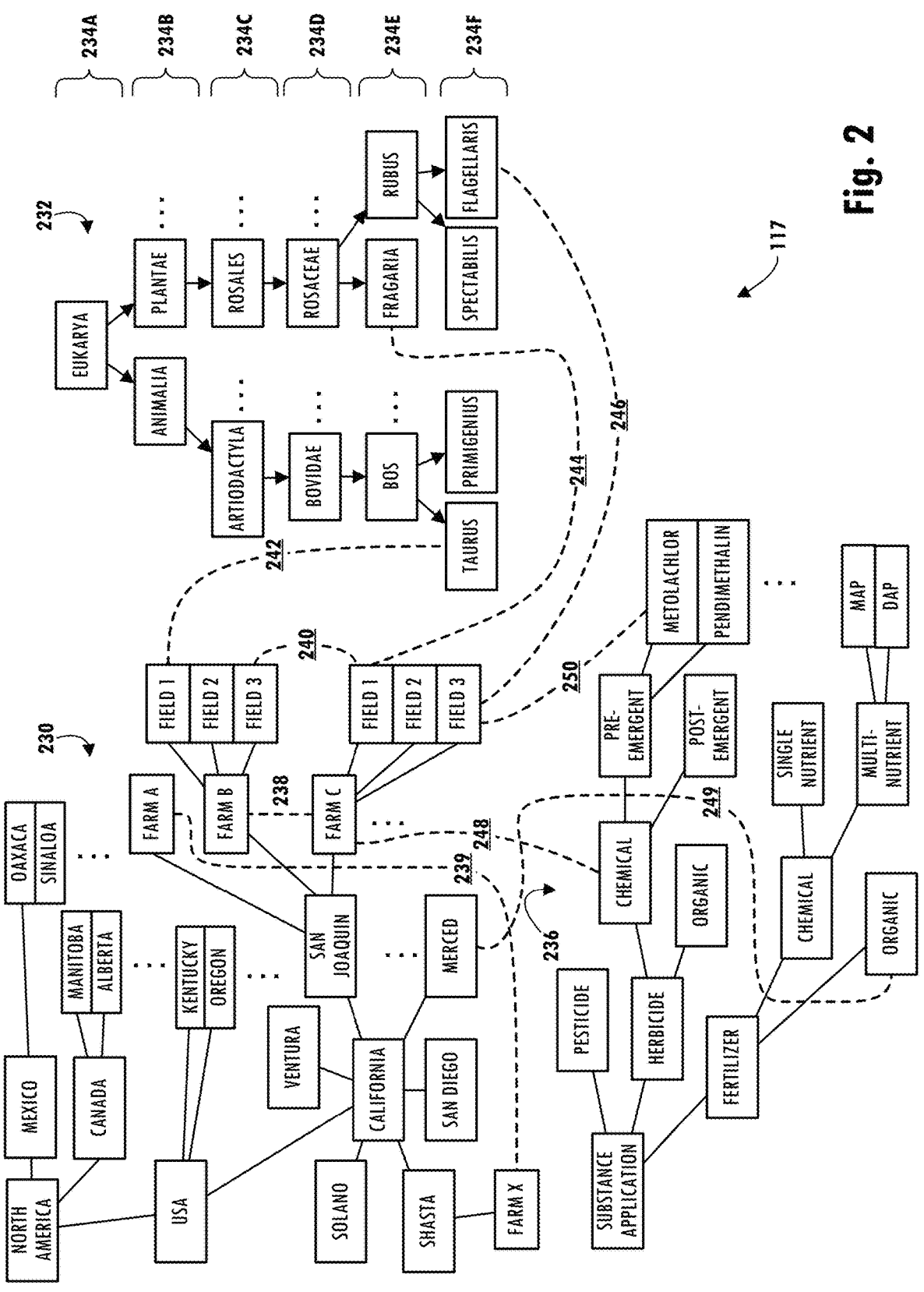
FIG. 2 schematically depicts an example agricultural knowledge graph, in accordance with various implementations.

FIG. 2 schematically depicts part of an example agricultural KG 117, in accordance with various implementations. The agricultural KG 117 depicted in FIG. 2 is for illustrative purposes only, is not meant to be comprehensive, and accordingly, should not be viewed as limiting in any way. Each rectangle in FIG. 2 comprises a node of agricultural KG 117 that represents an entity. Each edge represents a relationship between entities represented by the nodes it connects.

In this example, agricultural KG 117 includes a first portion indicated generally at 230 that represents locations, a second portion indicated generally at 232 that represents organisms, and a third portion indicated generally at 236 that represents agricultural tasks, in this case, application of substances such as pesticides, herbicides, and fertilizers. It should be understood that agricultural KG 117 may include other portions that represent other entities relevant to agriculture, such as agricultural equipment (e.g., robots, tractors, threshers, sprayers, cisterns), robots (e.g., 108-1 to 108-M), climate events (e.g., hurricanes, floods, draughts), stewardship events (e.g., instance of applied tillage, applied crop rotation), and so forth.

First portion 230 of agricultural KG 117 includes, at top left, a node representing North America. Although not shown, agricultural KG 117 may or may not include nodes representing the other continents of Earth. The North America node is connected to nodes representing Mexico, Canada, and the United States (USA). Each of those country nodes is, in turn, connected to nodes representing their various states. For instance, the USA node is connected to nodes representing California, Kentucky, and Oregon (and presumably nodes representing other states and territories of the USA). The California node is connected to nodes representing various California counties, such as Ventura, Solano, Shasta, San Diego, Merced, and San Joaquin, to name a few. Other states' nodes may or may not be similarly connected to county nodes.

The San Joaquin County node is connected to some number of nodes representing some number of farms or other agricultural centers in San Joaquin County. In FIG. 2, for instance, the San Joaquin node is connected to nodes representing Farm A, Farm B, Farm C, and so on. Each of these farm nodes may, in turn, be connected to node(s) representing individual agricultural fields or plots. For example, Farm B's node is connected to nodes representing fields 1-3. Similarly, Farm C's node is connected to nodes representing fields 1-3. As indicated by the various ellipses depicted in FIG. 2, it should be apparent that the various entities represented by the visible nodes are not intended to be limiting.

Various nodes of first portion 230 may be linked to each other in ways other than the solid lines depicted in FIG. 2, such as ad hoc relationships. For instance, nodes representing Farms B and C in San Joaquin County of California are connected by dashed edge 238 to indicate that these farms have a relationship beyond being located in the same county. For instance, edge 238 may represent the fact that these farms are proximate with each other, even sharing a border. Another edge 239 connecting Farm A in San Joaquin County with a Farm X in Shasta County may represent, for example, the fact that these two farms have been designated as similar or identical Agro Ecological Zones ("AEZs," e.g., as provided by the Food and Agricultural Organization of the United Nations). Alternatively, nodes representing farms (or counties, or states, or individual fields/plots) having the same AEZ may be connected to a separate node representing that shared AEZ.

Second portion 232 of agricultural KG 117 comprises a phenotypic taxonomy of nodes representing a taxonomic hierarchy of organisms. The taxonomic hierarchy, and hence, phenotypic taxonomy of nodes (which will also be referred to herein with the reference numeral 232), is organized into multiple levels or ranks 234A-F. In this example, there are six ranks: 234A corresponding to domain; 234B corresponding to kingdom; 234C corresponding to order; 234D corresponding to family; 234E corresponding to genus, and 234F corresponding to species. However, this is not intended to be limiting, and other ranks, such as phylum, class, or various subcategories of various ranks, may also be included. The nodes of phenotypic taxonomy of nodes 232 may provide access to phenotyping ML models, e.g., by linking or pointing to files or other data structures containing the weights of these phenotyping ML models.

Third portion 236 of agricultural KG 117 represents entities associated with the application of substances to agricultural areas. In FIG. 2 these substances may include pesticides, herbicides, and fertilizers, as indicated by the three nodes, but this is not intended to be limiting. FIG. 2 also demonstrates that some subcategories or subclasses of these substances can be represented by additional nodes. For example, the node representing herbicide is connected to nodes representing chemical (or inorganic) herbicides and organic herbicides. The node representing chemical (or inorganic) herbicides is connected to nodes representing pre-emergent herbicides and post-emergent herbicides. The node representing pre-emergent herbicides is connected to nodes representing various types or classes of pre-emergent herbicides, such as metolachlor and pendimethalin, to name a few. The fertilizer node similarly is connected to levels of nodes separating fertilizers into chemical versus organic, as well as single nutrient versus multi-nutrient. And the multi-nutrient fertilizer node is connected to nodes representing monoammonium phosphate (MAP) and diammonium phosphate (DAP).

Other types of ad hoc relationships may be defined as part of agricultural KG 117, in addition to those described previously. For instance, an edge 240 is defined between Field 3 of Farm B in San Joaquin county and Field 1 of Farm C in the same county. This edge may specify, for instance, that these fields share a border, are adjacent, and/or are within a predetermined distance of each other. This may be consequential, for instance, because pests, diseases, weeds, or other phenomena that impact one of these fields may also impact (or be likely to impact) the other. Alternatively, nodes representing fields may be connected to each other with edges, where the edges themselves represent distances between the fields. Another edge 242 is defined between the node representing Field 1 of Farm B in San Joaquin County and a node representing the Taurus species (cattle) of phenotypic taxonomy of nodes 232. This may indicate that cattle are being, or have been, raised or allowed to graze in Field 1.

Another edge 244 connects the node representing Field 1 of Farm C in San Joaquin County and the node representing the Fragaria genus; this may represent an ad hoc relationship of strawberries and/or other species of that genus being grown, or having been grown, in that field. Yet another edge 246 is defined between the node representing Field 3 of Farm C in San Joaquin County and the node representing the flagellaris species of the *Rubus* genus. This may indicate that the northern dewberry is being, or has been, grown in Field 3. Yet another edge 248 is defined between the node representing Farm C of San Joaquin County and the node representing chemical herbicides. This may indicate that chemical herbicides, not organic, have been, are being, and/or will be applied to all fields of Farm C. Yet another edge 250 indicates that the pre-emergent metolachlor has been, is being, or will be applied to Field 3 of Farm C in San Joaquin County.

The ad hoc relationships represented by edges 238-250 in FIG. 2 may be created in various ways. In some implementations, they may be created manually, e.g., by operating a graphical user interface (GUI) to draw edges between the various nodes. Additionally or alternatively, these relationships may be defined using database records/fields. In some implementations, these edges may be created based on natural language input. For instance, a grower of Farm C in San Joaquin County may utter the statement, "I'm only going to use chemical herbicides in Field 3." This utterance may be speech-to-text (STT) processed to generate text, which may then be analyzed using natural language processing. The result of the natural language processing may be used to generate edge 248. Other sources of natural language may include, for instance, contracts, correspondence, regulations, etc. For example, if a regulation is issued that requires all strawberry farms in Merced County, California to use only organic fertilizers, that regulation may be natural language processed to generate an edge 249 between the node representing organic fertilizer and the node representing Merced County.

Figure 3:
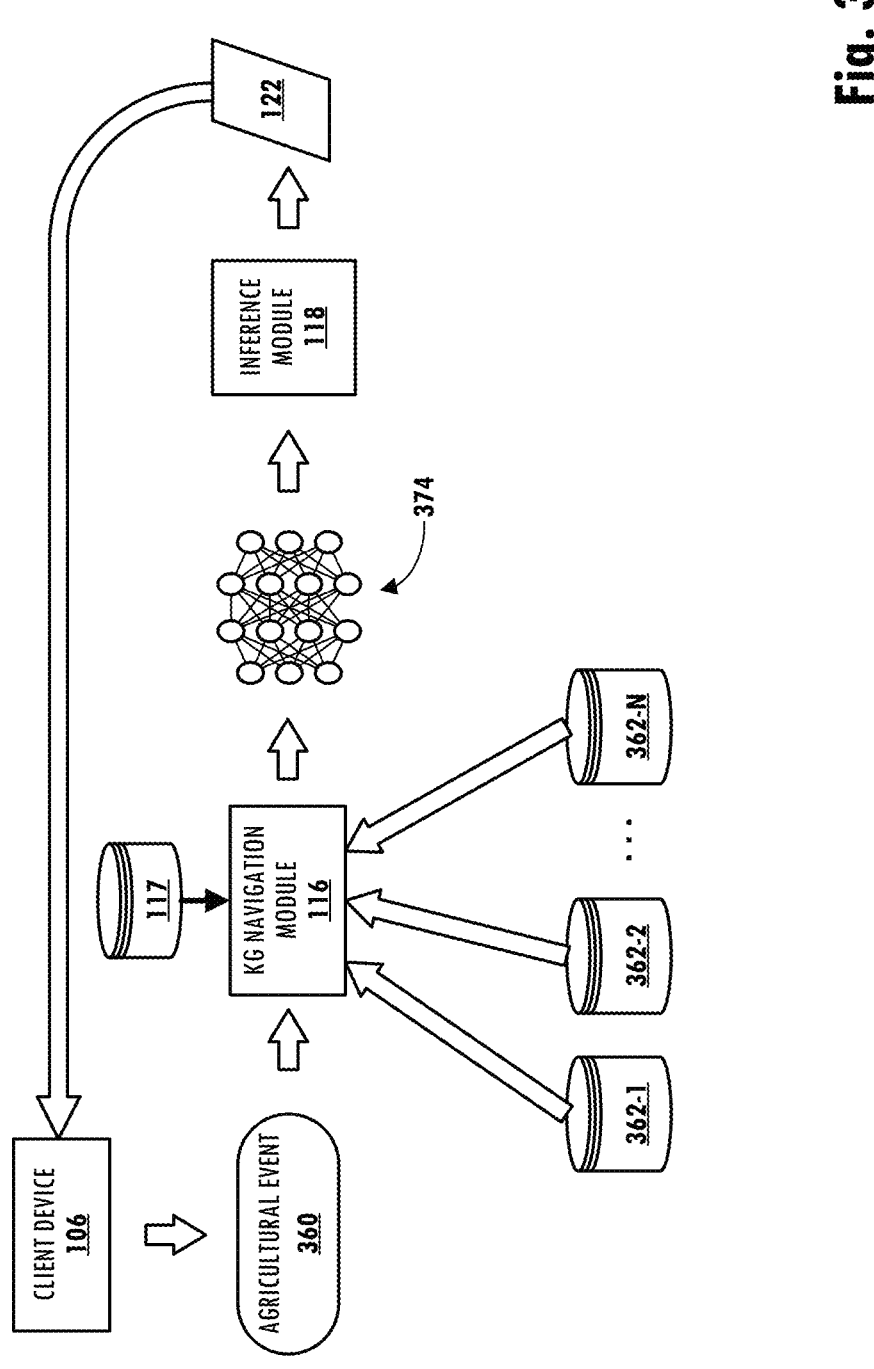
FIG. 3 schematically depicts an example of how selected aspects of the present disclosure may be implemented, in accordance with various implementations.

FIG. 3 schematically depicts an example of how data may be processed using techniques described herein. Starting at left, an agricultural event 360 may be triggered, e.g., by a client device 106 (although this is not required), and may be detected by KG navigation module 116. As noted previously, agricultural events may take a variety of forms. A subject agricultural field being selected in a field browsing GUI or being physically entered may qualify as an agricultural event. Onboarding data, such as sensor data and/or images depicting crops in a field, to agricultural KG 117 may qualify as an agricultural event. Inferences generated from data onboarded to agricultural KG 117 may qualify as agricultural events. Multiple non-limiting examples of agricultural events will be discussed with regard to FIG. 4.

KG navigation module 116 may detect the agricultural event, e.g., by monitoring changes to agricultural KG 117. In response, KG navigation module 116 may navigate agricultural KG 117 in order to identify nodes/edges relevant to the agricultural event. Based on these nodes, and as shown by the arrows, KG navigation module 116 may retrieve data and/or ML model(s) 374 pertinent to the subject field from a variety of different sources 362-1 to 362-N. These data sources 362 may include publicly available sources such as weather databases and/or government records, as well as other data sources such as databases controlled by agricultural entities (e.g., with crop yield data, crop management records, etc.).

In various implementations, KG navigation module 116, inference module 118, and/or another component (not depicted) may preprocess the data retrieved from the various sources 362-1 to 362-N to put the data in condition for processing using the one or more accessed ML models 374. For example, inference module 118 may encode (e.g., using an encoder portion of an encoder-decoder model) various data into reduced-dimensionality (yet semantically rich) feature vectors/embeddings. In some implementations, these vectors/embeddings may have dimensions that correspond to input dimensions of one or more of the accessed ML models 374. Additionally or alternatively, in some implementations, the retrieved data may be maintained in graph form (or manipulated into graph form, if necessary) so that a graph-based ML model, such as a graph neural network (GNN) or variations thereof, can be applied. Additionally or alternatively, in some implementations, one or more of the ML models 374 may be capable of flexibly processing inputs of varying dimensions. For example, one or more of the ML models 374 may take the form of a transformer network or other sequence-to-sequence model that can process multiple iterations of inputs in various numbers.

Regardless of how (or whether) data is preprocessed, inference module 118 may process the data using one or more of the ML models 374 identified by KG navigation module 116 to generate output that includes and/or is indicative of agricultural inferences. ML model(s) 374 can be regression or classification ML models. Accordingly, the inferences 122 they generate likewise can be predicted quantities (e.g., probabilities, counts) and/or classifications. Inferences 122 may take various forms, such as estimated fruit counts, predicted crop yields, annotations of various plant traits, classifications of individual plants, disease detection, pest detection, estimated soil carbon content, and other soil properties, to name a few.

Based on inferences 122, and as shown by the arrow back to client device 106, in some implementations, one or more messages that convey one or more of inferences 122 may be returned to client device 106, e.g., as a push notification, email, text message, etc. These messages can take various forms, such as warnings, recommendations, predictions, or any combination thereof. For example, a message may be generated that both informs the reader that a crop yield is predicted to fall below some threshold and that recommends one or more remedial actions (e.g., applying fertilizer, altering irrigation, culling subsets of plants, killing weeds) that can be taken to potentially increase the crop yield.

Figure 4:
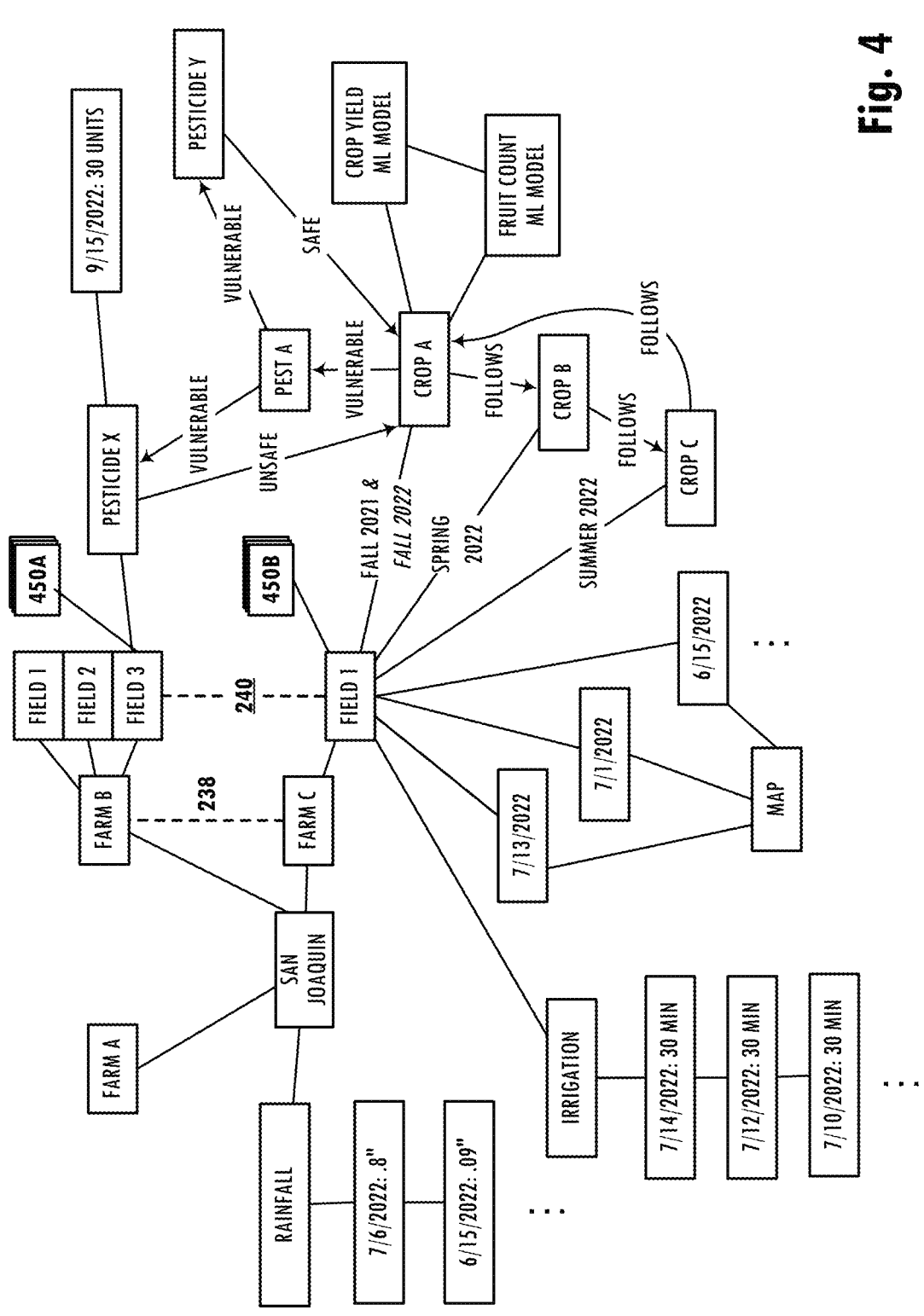
FIG. 4 schematically depicts a portion of the agricultural knowledge graph of FIG. 3, with illustrative examples of techniques described herein being applied.

FIG. 4 schematically depicts a portion of agricultural KG 117 depicted in FIG. 2, with somewhat more detail about farms in San Joaquin County, California. In this example, various nodes connected to field 1 of Farm C are depicted in greater detail. For instance, the San Joaquin County node is connected to a "rainfall" node, which in turn is connected to multiple nodes representing rainfall events in San Joaquin County: 0.8" on July 6, 0.9" on June 15, . . . Field 1 of Farm C is also connected to an irrigation node that itself is connected to irrigation events that were performed in Field 1, including thirty minutes of irrigation applied on July 14, July 12, July 10, and so forth. Thus, the rainfall events logged for San Joaquin County and the irrigation events logged for field 1 can be taken together to determine total crop watering that occurred in field 1.

Field 1 is also connected to a node representing MAP (monoammonium phosphate) fertilizer via one or more event nodes, which indicate MAP application at field 1 on July 13, July 1, and June 15. The ways in which nodes are connected in FIGS. 2 and 4 are not meant to be limiting. For example, rather than being connected to a MAP node, the edges from field 1 of Farm C could connect to generic dates, with the edges themselves representing MAP application.

Agricultural KG 117 can also be used to track crops planted in fields over time, as well as to indicate which crops are suitable for successive growth as part of a desirable/effective crop rotation. For example, field 1 of Farm C is connected via edges to a sequences of nodes representing a sequence (e.g., rotations) of crops: CROP A having been grown in fall 2021, CROP B having been grown in spring 2022, and CROP C having been grown in summer 2022. Additionally, "follows" edges are depicted between the nodes representing CROP A, CROP B, and CROP C, indicating a desirable or acceptable crop rotation of {CROP A, CROP B, CROP C, CROP A, . . . }. Thus, it can be determined from agricultural KG 117 that in field 1, a desirable crop rotation is being followed.

These edges, particularly the "follows" edges, can also be leveraged to make recommendations. For example, upon an agricultural event such as the end of the summer 2022 crop cycle (e.g., detected by a user inputting harvest results), the node representing the summer 2022 crop, CROP C, can be identified. The "follows" edge depicted in FIG. 4 can be traversed to determine that the next crop that should be grown is CROP A. Thus, a message may be assembled and pushed to client device operated by a relevant stakeholder, recommending CROP A for Fall 2022 (as indicated by the italicized text on the edge between nodes representing field 1 and CROP A.

As noted previously, agricultural events associated with one field (or farm, or region) may, and likely will, impact or influence other fields/farms/regions that are nearby, e.g., adjacent, sharing boundaries, within a predetermined proximity or distance, etc. Accordingly, techniques described herein may leverage the relationships set forth by agricultural KG 117 to automatically generate, and push to relevant stakeholders, messages that include suitable recommendations, warnings, etc.

Continuing with the above example, suppose during Fall of 2022, CROP A is grown in field 1 of Farm C, as recommended to comport with the above-described crop cycle. As indicated by edge 240, field 1 of Farm C shares a border with field 3 of Farm B. Suppose further that an agricultural event is detected in which pesticide X is applied to field 3 of Farm B during Fall of 2022. This agricultural event is represented in agricultural KG 117 as an edge between the node representing field 3 of Farm C and the node representing Pesticide X, as well as an edge between the node representing Pesticide X and a node representing application on Sep. 15, 2022 in the amount of 30 units. Edges and nodes of agricultural KG 117 depicted in FIG. 4 can then be traversed to determine that Pest A is "vulnerable" to Pesticide X, and that CROP A—which is currently being grown in field 1 of Farm C—is "vulnerable" to Pest A. Thus, it can be surmised—and conveyed to relevant stakeholders via an automatically pushed message—that the CROP A being grown in field 1 of Farm C is at risk of being affected by the Pest A that ostensibly has invaded field 3 of Farm B.

It may not be the case that the same pesticide can be used in field 1 of Farm C as was used in field 3 of Farm B, however. To wit, an "unsafe" edge in FIG. 4 connects the nodes representing Pesticide X and CROP A, indicating that Pesticide X can inflict harm on CROP A. However, another "vulnerable" edge connects the nodes representing Pest A and Pesticide Y. identifying Pesticide Y as an alternative treatment against Pest A. Additionally, a "safe" edge connects the nodes representing CROP A and Pesticide Y, indicating that Pesticide Y is safe to apply to CROP A. Accordingly, a message may be assembled automatically and pushed to a relevant stakeholder, recommending application of Pesticide Y to field 1 of Farm C.

A similar recommendation may be generated via different sequences of events/edges/nodes as well, including nodes/edges that call for application of ML models. Using the same working example, suppose that instead of detecting application of thirty units of Pesticide X to field 3 of Farm B, images 450A captured of crops being grown in field 3 (e.g., captured by modular computing devices 111 mounted to agricultural vehicles 109) are onboarded to agricultural KG 117. Suppose further that these images are analyzed—e.g., by inference module 118 using one or more ML models trained to output one or more probabilities of one or more pests—to determine that the crop(s) grown in that field are infested with Pest A. That may constitute an agricultural event that triggers a recommendation to relevant stakeholder(s) of field 1 of Farm C, as described above.

As another example, suppose the grower in charge of field 1 of Farm C onboards images 450B of field 1 on a particular date within the Fall of 2022. These images 450B may be analyzed—e.g., by inference module 118 using a CNN crop classifier—to determine that CROP A is being grown in field 1 during the Fall of 2022. This inference may cause KG navigation module 116 to traverse edges/nodes from CROP A to nodes (shown at lower right in FIG. 4) representing, for example, a crop yield ML model and/or a fruit count ML model that are trained, respectively, to predict crop yield and count fruits of CROP A. As shown in FIG. 4, these two ML nodes may further be connected to each other, e.g., by virtue of the crop yield ML model utilizing output of the fruit count ML model. These edges may cause those ML models to be accessed and applied, e.g., by inference module 118, on images 450B of field 1 of Farm C.

In some implementations, other data sources associated with field 1 of Farm C may also be accessed as inputs for the crop yield ML model. For example, the rainfall and irrigation records represented in FIG. 4 at left, as well as the MAP application records at center bottom, may be accessed and used as inputs for the crop yield ML model. Intuitively, predicted crop yield may depend on not only the images, but on farming practices such as irrigation and fertilization. Additionally, past crops grown in field 1 of Farm C may be accessed as described above, e.g., to confirm that field 1 has been properly managed in accordance with a proper crop rotation, which also will likely impact yield of CROP A.

As another example, suppose a different crop, e.g., CROP B, is grown in field 1 of Farm C, and that Pesticide X and Pesticide Y both can be safely applied to CROP B. The relative efficacies of applying these two pesticides may depend on a variety of factors, such as types of pests present in the field, the condition (e.g., maturity) of the field or of crops growing in the field, weather, irrigation, past crop rotation, soil conditions, etc. Instead of the edges directly indicating which pesticide should be used, various ML models may be leveraged to select which pesticide will be most effective.

For example, a sequence-to-sequence ML model such a transformer network (e.g., Bidirectional Encoder Representations from Transformers, or "BERT", general purpose transformer, such as GPT-3, etc.) may be used to process a sequence of inputs relevant to field 1 of Farm C. Each input may include, for instance, a vector or embedding generated from a respective data source. For instance, one embedding may represent overall irrigation, another may represent past fertilization, another may represent crop rotation, another may represent tillage practices, and so forth. As each input embedding is processed, the transformer may generate output that can be used to make recommendations. For example, similarity measures between an output embedding generated by the transformer and reference embeddings corresponding to Pesticides X and Y may be determined, e.g., using Euclidean distance, cosine similarity, etc. The Pesticide having the highest similarity measure may be selected. Additionally or alternatively, the transformer itself, or one or more downstream models, may process the data and/or embeddings generated from the data to generate a probability distribution over a plurality of candidate pesticides, including X and Y.

In other implementations, the graph structure of agricultural KG 117 may be leveraged to generate inferences using one or more graph-based ML models or graph-based ML paradigms. For example, various subsets of nodes of agricultural KG 117 may be processed using a graph neural network (GNN), e.g., iteration after iteration. To facilitate this processing, at least some of the nodes may maintain their own states, e.g., in the form of one or more embeddings that represents (e.g., encodes) information relevant to the entity represented by that node. Additionally, at each iteration of the GNN, each node may receive and/or be infused with information (e.g., semantically rich embeddings) from its neighbors. Thus, the more iterations that pass, the more information each node receives from increasingly remote nodes.

For example, a node representing field 1 of Farm C may be infused with information from its neighboring nodes, and with additional information from additional nodes farther away after multiple iterations of the GNN. The embedding (s) received at the node representing field 1 of Farm C may be processed in various ways, e.g., combined, averaged, concatenated, etc. The resulting combined embedding at each iteration may represent, in effect, a state of field 1. This state of field 1 may then be processed, e.g., using another ML model such as a reinforcement learning policy, to generate a probability distribution over an action space of actions that can be performed in field 1 of Farm C. These actions may include agricultural tasks such as fertilizing, irrigating, de-weeding, culling, tilling, harvesting, applying herbicide, applying pesticide, etc. In some implementations, such a reinforcement learning policy may begin as a generic policy that is distributed to multiple different farms/fields. However, as time passes, each instance of the reinforcement learning policy may be trained, e.g., based on various reward functions, so that it becomes tailored to the particular farm at which it is deployed.

FIG. 5 illustrates a flowchart of an example method 500 for practicing selected aspects of the present disclosure during an inference phase. The operations of FIG. 5 can be performed by one or more processors, such as one or more processors of the various computing devices/systems described herein, such as by plant knowledge system 104. For convenience, operations of method 500 are described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system may detect that an agricultural event has occurred. For example, agricultural and/or climate data may be onboarded to KG 117 via input data module 114. The onboarding itself may constitute the event, and/or an agricultural inference drawn using the onboarded data subsequently may constitute the event. For instance, a grower may onboard images of a crop field, and then sometime later may request a particular agricultural inference based on those images, such as pest detection. If output of a pest-detection ML model indicates presence of a pest, the detected presence of those pests may constitute an agricultural event that triggers additional processing. As another example, an individual may "select" a particular agricultural field, e.g., by physically entering the field or selecting the field on a field browsing GUI.

In response to detecting the agricultural event, the system may proactively perform one or more of the following operations. At block 504, the system, e.g., by KG navigation module 116, may identify a plurality of nodes of agricultural KG 117 as related to the agricultural event. The plurality of identified nodes may include, for instance, one or more field nodes representing one or more subject agricultural fields to which the agricultural event is relevant. For example, if a user selects on a GUI or physically enters a particular agricultural field, then a node representing that particular agricultural field may be identified. The plurality of identified nodes may also include, for instance, one or more other nodes connected to one or more of the field nodes by one or more edges. For example, nodes representing climate events that influence the particular agricultural field, past crops grown in the agricultural field, current crops being grown in the agricultural field, soil conditions, agricultural practices (e.g., past fertilizing events, past herbicide or pesticide applications, tillage, etc.), neighboring fields/farms, etc., may be identified by KG navigation module 116.

At block 506, the system may access one or more ML models based on one or more of the nodes identified at block 504 and/or based on one or more of the edges that connect two or more of the identified nodes. For example, if strawberries are being grown in the subject agricultural field, then node(s) representing strawberries may have been identified. These strawberry node(s) may provide access to various ML models that may be used to process strawberry-related data, such as strawberry count ML models, strawberry yield prediction ML models, ML models trained to detect pests that typically infest strawberry fields, etc.

In some implementations, at block 508, the system may proactively cause one or more client devices controlled by an agricultural entity to solicit identification of and/or access to one or more of the data sources controlled by the agricultural entity. For example, at block 506 a particular ML model may be identified that is configured to process certain inputs. If a data source at which one or more of these inputs is available is unknown or is inaccessible, then at block 508, an agricultural entity such as a grower may receive a solicitation, such as an email, push notification, text message, etc., seeking the agricultural entity's identification of and/or permission to use data source(s) controlled by that agricultural entity.

As one example, the agricultural entity may control one or more edge servers (e.g., on or near a farm) that store a local portion of agricultural KG 117. This local portion of agricultural KG 117 may include, for instance, database(s)

containing sensitive/private records controlled by the agricultural entity, such as past crop yields, past sale prices for crops, past effective fertilizer compositions, etc. To the extent any of these local records may be needed as inputs for a ML model, the agricultural entity may be solicited for access. In some implementations, to protect this sensitive data, the pertinent ML model(s) may be pushed to, and applied by, the edge server(s), avoiding the need to upload the sensitive data to the cloud.

At block 510, the system may retrieve data from one or more data sources controlled by an agricultural entity that contain data that is relevant to the one or more subject agricultural fields. These data sources may include, for instance, those data sources for which identification and/or permission was solicited at block 508, and/or data sources that are available without the need for solicitation. For example, weather data source(s) associated with a county in which the subject agricultural field is located may be accessible without solicitation.

At block 512, the system may process the data retrieved at block 510 based on the one or more ML models accessed at block 506 to generate one or more inferences (e.g., 122) about one or more of the subject agricultural fields. For example, one or more ML models may be used to process data and generate output indicating that particular crop(s) are likely to produce substantial yield in a subject agricultural field, given various data retrieved from various data sources.

At block 514, the system may generate one or more agricultural messages based on the one or more inferences. For instance, the system may generate a push notification, email, text message, paper mailing, etc., that recommends which crops to grow in the subject agricultural field, how to manage crops grown in the agricultural field, how to cull some crops to the benefit of others, how to till the field, etc. Or, the message may include a warning or alert, such as that a particular pest has been detected, that the crops appear to be under-irrigated, that soil composition appears to be suboptimal, etc. At block 516, the system may push the one or more agricultural messages to one or more client computing devices controlled by the agricultural entity.

Figure 6:
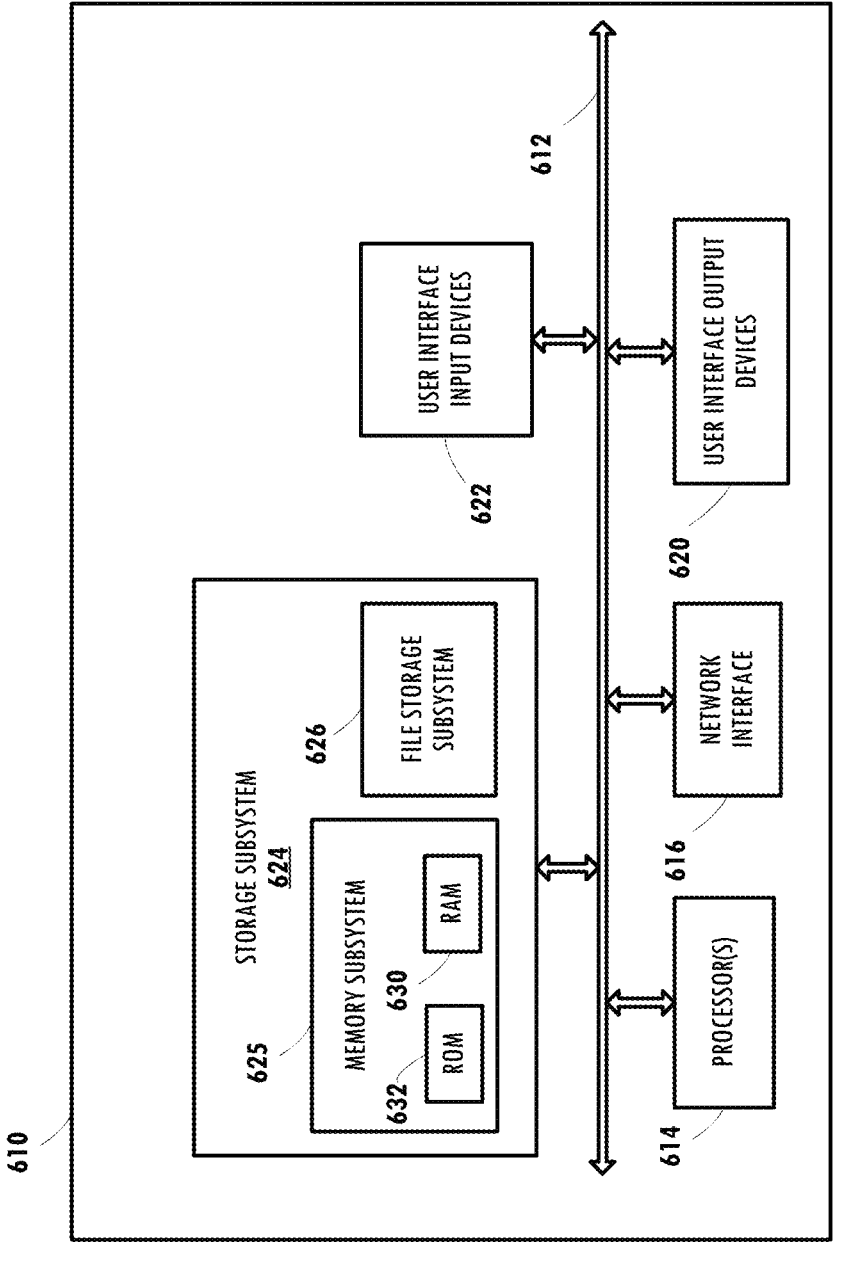
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1-4.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

detecting that an agricultural event has occurred, wherein the agricultural event is detected when new data is included in an agricultural knowledge graph in relation to an event that occurs in a nearby agricultural field that is adjacent to, or within a predetermined distance of, one or more subject agricultural fields; and in response to detecting that the agricultural event has occurred, proactively performing the following operations:

identifying a plurality of nodes of the agricultural knowledge graph as related to the agricultural event, wherein the agricultural knowledge graph includes nodes connected by edges that represent semantic relationships between the nodes, and wherein the plurality of identified nodes includes one or more field nodes representing the one or more subject agricultural fields, one or more field nodes representing the nearby agricultural field to which the agricultural event is relevant, and one or more other nodes connected to the one or more field nodes by one or more edges, wherein the one or more other nodes correspond to past practices implemented in the nearby agricultural field;

accessing one or more machine learning models based on one or more of the plurality of identified nodes or the one or more edges that connect two or more of the plurality of identified nodes, wherein at least one of the one or more machine learning models generates inferences related to a past practice of the past practices;

retrieving data from one or more data sources controlled by an agricultural entity, wherein the one or more data sources contain data that is relevant to the one or more subject agricultural fields;

processing the retrieved data based on the one or more machine learning models to generate one or more inferences about the one or more subject agricultural fields, the one or more inferences related to implementation of the past practice in the one or more subject agricultural fields;

generating one or more agricultural messages based on the one or more inferences, wherein the one or more agricultural messages includes a recommendation for an agricultural operation to be performed with respect to the one or more subject agricultural fields in response to the detected agricultural event; and pushing the one or more agricultural messages to one or more client computing devices.

2. The method of claim 1, wherein the one or more proactively performed operations include proactively causing at least one of the one or more client computing devices to solicit identification of and/or access to the one or more of the data sources controlled by the agricultural entity.

3. The method of claim 1, wherein detecting that the agricultural event has occurred includes detecting one or more changes to the agricultural knowledge graph, wherein the one or more changes corresponds to the agricultural event being included as data in a location corresponding to the nearby agricultural field.

4. The method of claim 3, wherein the agricultural event includes a weather event, and the one or more changes to the agricultural knowledge graph include onboarding of new weather data describing the weather event.

5. The method of claim 3, wherein the agricultural event includes a valuation of a type of crop grown in the nearby agricultural field, and the one or more changes to the agricultural knowledge graph include onboarding of new data describing the valuation.

6. The method of claim 1, wherein the agricultural event includes a presence of a computing device carried by an agricultural worker being detected in the nearby agricultural field.

7. The method of claim 1, wherein identifying the plurality of nodes includes traversing the agricultural knowledge graph from the one or more field nodes representing the subject agricultural fields to another field node representing the nearby agricultural field.

8. The method of claim 1, wherein the agricultural event includes one or more of an application of an herbicide or an application of a pesticide.

9. The method of claim 1, wherein the agricultural event includes one or more of an incidence of a plant disease or a pest infestation.

10. The method of claim 1, wherein the detected agricultural event is crop yield that is predicted to fall below a threshold, the recommendation includes to perform the agricultural operation to increase the crop yield, the agricultural operation to correspond to a remedial action for the one or more subject agricultural fields.

11. The method of claim 1, wherein to detect that the agricultural event has occurred the one or more processors are to detect one or more changes to the agricultural knowledge graph, wherein the one or more changes corresponds to the agricultural event being included as data in a location corresponding to the nearby agricultural field.

12. A system comprising one or more processors and memory storing instructions that, in response to execution by the one or more processors, cause the one or more processors to:

detect that an agricultural event has occurred, wherein the agricultural event is detected when new data is included in an agricultural knowledge graph in relation to an event that occurs in a nearby agricultural field that is adjacent to, or within a predetermined distance of, one or more subject agricultural fields;

in response to detection of the agricultural event, proactively perform the following operations:

identify a plurality of nodes of the agricultural knowledge graph as related to the agricultural event, wherein the agricultural knowledge graph includes nodes connected by edges that represent semantic relationships between the nodes, and wherein the plurality of identified nodes includes one or more field nodes representing the one or more subject agricultural fields, one or more field nodes representing the nearby agricultural field to which the agricultural event is relevant, and one or more other nodes connected to the one or more field nodes by one or more edges, wherein the one or more other nodes correspond to past practices implemented in the nearby agricultural field;

access one or more machine learning models based on one or more of the plurality of identified nodes or the one or more edges that connect two or more of the plurality of identified nodes, wherein at least one of the one or more machine learning models generates inferences related to a past practice of the past practices;

retrieve data from one or more data sources controlled by an agricultural entity, wherein the one or more data sources contain data that is relevant to the one or more subject agricultural fields;

process the retrieved data based on the one or more machine learning models to generate one or more inferences about the one or more subject agricultural fields, the one or more inferences related to implementation of the past practice in the one or more subject agricultural fields;

generate one or more agricultural messages based on the one or more inferences, wherein the one or more agricultural messages includes a recommendation for an agricultural operation to be performed with respect to the one or more subject agricultural fields in response to the detected agricultural event; and push the one or more agricultural messages to one or more client computing devices.

13. The system of claim 12, wherein the one or more proactively performed operations include to proactively cause at least one of the one or more client computing devices to solicit identification of and/or access to the one or more data sources controlled by the agricultural entity.

14. The system of claim 12, wherein the agricultural event is detected based on one or more changes to the agricultural knowledge graph, wherein the one or more changes corresponds to the agricultural event being included as data in a location corresponding to the nearby agricultural field.

15. The system of claim 14, wherein the agricultural event includes a weather event, and the one or more changes to the agricultural knowledge graph include onboarding of new weather data describing the weather event.

16. The system of claim 14, wherein the agricultural event includes a valuation of a type of crop grown in the nearby agricultural field, and the one or more changes to the agricultural knowledge graph include onboarding of new data describing the valuation.

17. The system of claim 12, wherein the agricultural event includes a presence of a computing device carried by an agricultural worker being detected in the nearby agricultural field.

18. The system of claim 12, wherein the plurality of nodes are identified by traversing the agricultural knowledge graph from the one or more field nodes representing the subject agricultural fields to another field node representing the nearby agricultural field.

19. At least one non-transitory computer-readable medium comprising instructions that, when executed by one or more processors, cause the one or more processors to:

detect that an agricultural event has occurred, wherein the agricultural event is detected when new data is included in an agricultural knowledge graph in relation to an event that occurs in a nearby agricultural field that is adjacent to, or within a predetermined distance of, one or more subject agricultural fields; and in response to detection that the agricultural event has occurred, proactively perform the following operations:

identify a plurality of nodes of the agricultural knowledge graph as related to the agricultural event, wherein the agricultural knowledge graph includes nodes connected by edges that represent semantic relationships between the nodes, and wherein the plurality of identified nodes includes one or more field nodes representing the one or more subject agricultural fields, one or more field nodes representing the nearby agricultural field to which the agricultural event is relevant, and one or more other nodes connected to the one or more field nodes by one or more edges, wherein the one or more other nodes correspond to past practices implemented in the nearby agricultural field;

access one or more machine learning models based on one or more of the plurality of identified nodes or the one or more edges that connect two or more of the plurality of identified nodes, wherein at least one of the one or more machine learning models generates inferences related to a past practice of the past practices;

retrieve data from one or more data sources controlled by an agricultural entity, wherein the one or more data sources contain data that is relevant to the one or more subject agricultural fields;

process the retrieved data based on the one or more machine learning models to generate one or more inferences about the one or more subject agricultural fields, the one or more inferences related to implementation of the past practice in the one or more subject agricultural fields;

generate one or more agricultural messages based on the one or more inferences, wherein the one or more agricultural messages includes a recommendation for an agricultural operation to be performed with respect to the one or more subject agricultural fields in response to the detected agricultural event; and push the one or more agricultural messages to one or more client computing devices.

20. The non-transitory computer-readable medium of claim 19, wherein the one or more proactively performed operations include to proactively cause at least one of the one or more client computing devices to solicit identification of and/or access to the one or more of the data sources controlled by the agricultural entity.

* * * * *